United States Patent
Bach

(10) Patent No.: US 12,523,548 B2
(45) Date of Patent: Jan. 13, 2026

(54) THERMISTOR SELF-HEATING COMPENSATION

(71) Applicant: BorgWarner Inc., Auburn Hills, MI (US)

(72) Inventor: James C. Bach, Westfield, IN (US)

(73) Assignee: BorgWarner Inc., Auburn Hills, MI (US)

(*) Notice: Subject to any disclaimer, the term of this patent is extended or adjusted under 35 U.S.C. 154(b) by 630 days.

(21) Appl. No.: 17/879,266

(22) Filed: Aug. 2, 2022

(65) Prior Publication Data

US 2024/0044724 A1 Feb. 8, 2024

(51) Int. Cl.
*G01K 15/00* (2006.01)
*G01K 7/22* (2006.01)

(52) U.S. Cl.
CPC ............ *G01K 15/005* (2013.01); *G01K 7/22* (2013.01)

(58) Field of Classification Search
CPC .......... G01K 15/005; G01K 7/22; G01K 7/24
USPC ................................................. 374/185, 141
See application file for complete search history.

(56) References Cited

U.S. PATENT DOCUMENTS

| | | | | |
|---|---|---|---|---|
| 2,259,945 A | * | 10/1941 | Velia | H04B 3/04 333/16 |
| 3,475,830 A | * | 11/1969 | Botts | G05D 22/02 34/533 |
| 3,557,342 A | * | 1/1971 | Chambers | G05D 23/1912 219/499 |
| 3,559,883 A | * | 2/1971 | Buiting | G05D 23/1909 236/78 D |
| 3,942,123 A | * | 3/1976 | Georgi | G01K 13/20 377/16 |

(Continued)

FOREIGN PATENT DOCUMENTS

| | | | | |
|---|---|---|---|---|
| CA | 2847851 A1 | * | 3/2013 | ......... G01F 23/0061 |
| JP | H073363 B2 | * | 1/1995 | |

(Continued)

OTHER PUBLICATIONS

17879266_Dec. 10, 2024_CN_109994993_B_H.pdf,Mar. 24, 2023.*

(Continued)

*Primary Examiner* — John E Breene
(74) *Attorney, Agent, or Firm* — Reising Ethington P.C.

(57) ABSTRACT

A temperature monitoring circuit and control system for compensating for self-heating effects of a thermistor used for measuring a temperature within a system includes a thermistor, a pull-up resistor, a node configured to receive a reference voltage, and a node configured to supply a sensed voltage; the control system measures a voltage across the thermistor; determines a thermistor resistance based on a known supply voltage and a known biasing impedance supplying current to the thermistor; determines thermistor temperature based on the thermistor resistance; determines a thermal rise value due to thermistor self-heating based on the known supply voltage, the thermistor's heat dissipation constant, and the calculated thermistor resistance; and creates a compensated thermistor temperature value by subtracting the thermal rise value from the determined thermistor temperature thus providing a more accurate measurement of the device being monitored by the thermistor.

18 Claims, 3 Drawing Sheets

(56) References Cited

U.S. PATENT DOCUMENTS

| | | | | |
|---|---|---|---|---|
| 4,276,536 | A | * | 6/1981 | Wisnia .................. G01F 23/247 338/23 |
| 5,629,676 | A | * | 5/1997 | Kartoun ................. G08B 13/19 340/567 |
| 6,161,958 | A | * | 12/2000 | Rattman ............. G08B 29/043 327/512 |
| 2010/0176746 | A1 | * | 7/2010 | Catalano ................ H05B 45/56 374/185 |
| 2012/0062041 | A1 | * | 3/2012 | Nelson ..................... G01K 7/24 307/116 |
| 2024/0044724 | A1 | * | 2/2024 | Bach ........................ G01K 7/22 |

FOREIGN PATENT DOCUMENTS

| | | | | |
|---|---|---|---|---|
| JP | H1030949 | A | * | 2/1998 |
| JP | 2007113921 | A | * | 5/2007 |
| JP | 2007526481 | A | * | 9/2007 |
| JP | 2011176592 | A | * | 9/2011 |
| JP | 2013164289 | A | * | 8/2013 |
| RU | 2326354 | C1 | * | 6/2008 |
| RU | 2732838 | C1 | * | 9/2020 ............... G01K 1/20 |
| WO | WO-2014091852 | A1 | * | 6/2014 ............... G01K 1/12 |
| WO | WO-2014142806 | A1 | * | 9/2014 ............... G01F 1/69 |
| WO | WO-2021085808 | A1 | * | 5/2021 ........... G01K 15/007 |

OTHER PUBLICATIONS

17879266_Dec. 10, 2024_JP_2013164289_A_H.pdf,Aug. 22, 2013.*
17879266_Dec. 10, 2024_WO_2014091852_A1_I.pdf,Jun. 19, 2014.*
17879266_Dec. 10, 2024_WO_2014142806_A1_H.pdf,Sep. 18, 2014.*
7879266_Dec. 27, 2024_CA_2847851_A1_H.pdf,Mar. 21, 2013.*
17879266_Jan. 2, 2025_JP_2007526481_A_H.pdf,Sep. 13, 2007.*
17879266_Jan. 2, 2025_RU_2326354_C1_H.pdf,Sep. 23, 2020.*
17879266_Jan. 2, 2025_RU_2732838_C1_H.pdf,Sep. 23, 2020.*
17879266_Jan. 2, 2025_JP_H073363_B2_H.pdf,Jan. 18, 1995.*
17879266_Jan. 2, 2025_JP_H1030949_A_H.pdf,Feb. 3, 1998.*
17879266_Jan. 2, 2025_JP_2007113921_A_H.pdf,May 10, 2007.*
17879266_Jan. 2, 2025_WO_2021085808_A1_H.pdf,May 6, 2021.*
Penanen et al., "Correction for Self-Heating When Using Thermometers as Heaters in Precision Control Applications", Tech Briefs, Mar. 1, 2011, pp. 1-5. (Year: 2011).*
Jason Sachs, Thermistor signal conditioning: Dos and Don'ts, Tips and Tricks, www.embeddedrelated.com/showarticle/91.php, Jun. 15, 2011 (14 pages).
Hadi Ebrahimi-Darkhaneh, Measurement error caused by self-heating in NTC and PTC thermistors, Analog Design Journal, 2019 (8 pages).
Thermistor, Wikipedia, wikipedia.org, Last edited on Oct. 13, 2022 (11 pages).
David Van Ess, PSoC® 1 Temperature Measurement With Thermistor, Cypress, Accessed Jan. 24, 2023 (11 pages).
Julian Trubin, Thermistor Self Heating Effects, www.idc-online.com/technical_references/pdfs/electronic_engineering/Thermistor_Self_Heating_Effects.pdf, Last updated: Jun. 2013 (2 pages).

* cited by examiner

THERMISTOR SELF-HEATING COMPENSATION

TECHNICAL FIELD

The present application relates to electrical circuits and, more particularly, to thermistors (specifically NTC thermistors) and their use in sensing (monitoring) the temperature of devices within a system.

BACKGROUND

Thermistors are temperature dependent electrical components that can be used to monitor the temperature of an object by measuring its resistance and translating the resistance to a temperature. Thermistors are essentially resistors whose chemical composition are deliberately designed to produce a known and repeatable change in resistance across its operating temperature range. Knowing this resistance-vs-temperature relationship makes it simple and inexpensive for a controller to monitor the temperature of a device within the system it is controlling.

SUMMARY

In one implementation, a method of compensating for self-heating effects of a thermistor used for measuring a temperature within a system includes: measuring a voltage across a thermistor; determining a thermistor resistance based on a known supply voltage and a known biasing impedance supplying current to the thermistor; determining thermistor temperature based on the thermistor resistance; determining a thermal rise value due to thermistor self-heating based on the known supply voltage, known heat dissipation constant of the thermistor, and the determined thermistor resistance; and creating a compensated thermistor temperature value by subtracting the thermal rise value from the determined thermistor temperature.

In another implementation, a temperature monitoring circuit and control system for compensating for self-heating effects of a thermistor used for measuring a temperature within a system includes a thermistor, a pull-up resistor, a node configured to receive a reference voltage, and a node configured to supply a sensed voltage; the control system measures a voltage across the thermistor; determines a thermistor resistance based on a known supply voltage and a known biasing impedance supplying current to the thermistor; determines thermistor temperature based on the thermistor resistance; determines a thermal rise value due to thermistor self-heating based on the known supply voltage, known heat dissipation constant of the thermistor, and the determined thermistor resistance; and creates a compensated thermistor temperature value by subtracting the thermal rise value from the determined thermistor temperature.

DETAILED DESCRIPTION

In an ideal environment, the relationship between change in resistance within a thermistor and change in temperature would be perfectly linear. However, thermistors, particularly those known as NTC thermistors (having a negative temperature coefficient, exhibiting decreasing resistance with increasing temperature) are inherently non-linear and indeed almost exponential in behavior. Additionally, thermistors deployed to monitor very cold as well as very warm temperatures can include significant amounts of error over such a range of temperatures. One such source for error is the thermistor's potential for self-heating when sensing hot conditions using an NTC thermistor since higher currents are flowing through it when hot. For example, vehicles are designed to operate in environments that are very cold as well as those that are very hot, such as −40° C. to +150° C. It would be helpful to compensate for these errors for more accurate temperature measurement. A number of other solutions to this problem exist and involve altering the physical structure of the thermistor or the physical system using the thermistor. For example, it is possible to use a higher R-value thermistor and associated pull-up linearization resistor. However, elevated R-values may not perform optimally at lower temperatures thereby creating measurement errors. It is also possible to use a constant-current source (CCS) to supply power to the thermistor. But CCSs may add cost and consume additional space on a printed circuit board (PCB) as well as yielding a non-linear voltage output at the thermistor, especially at low temperatures. Adding a large mass as a heat sink is possible, but this may reduce responsiveness and increase thermal lag. Further, operating the thermistor using pulse width modulation (PWM) is possible in an effort to minimize self-heating, but this can increase complexity and circuitry; thermistors also typically include an RC noise filter ahead of an analog-to-digital (ADC) having a time constant that limits the rate at which the thermistor can be pulsed.

Thermistor accuracy can be improved by a control system that includes a microprocessor that can determine a thermistor error due to self-heating by monitoring the thermistor circuit and compensate for the self-heating effects of a thermistor used for measuring a temperature within a system. This may be helpful when conducting a relatively large amount of current due to inherently low thermistor resistance at higher temperatures. The system can estimate the amount of a thermistor's self-heating and subtract that amount from a measured temperature to improve accuracy. In some implementations, this system can include a thermistor linearization network in the form of a single pull-up resistor. In other implementations, the thermistor linearization network can include a plurality of pull-up resistors that are switched on and off depending on temperature.

Figure 1:
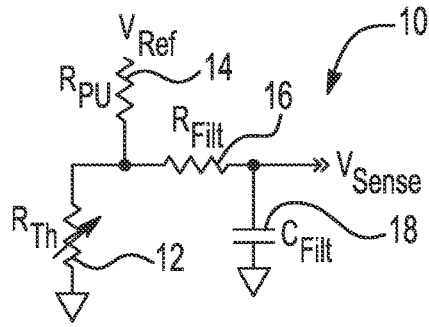
FIG. 1 is a circuit diagram depicting an implementation of a temperature monitoring circuit, the circuit being suitable for measuring temperatures over a specific and limited range of temperatures.

Turning to FIG. 1, a circuit diagram of one implementation of a temperature monitoring circuit 10 is shown. The temperature monitoring circuit includes a thermistor 12, a pull-up resistor 14, a noise filter resistor 16, and a noise filter capacitor 18. A reference voltage can be applied to a node and a sensing voltage can be monitored at another node. In one implementation, the pull-up resistor 14 can be 2250 ohms (Ω), however, the resistance values can vary depending on the application. Indeed, pull-up resistor 14 is generally selected so that it has approximately the same resistance as the thermistor 12 at some particular temperature of interest and thus the circuit is accurate over some range above/below that temperature. This type of circuit is generally useful when the range of temperatures needing to be sensed is not broad (say, ±25° C.).

Figure 2:
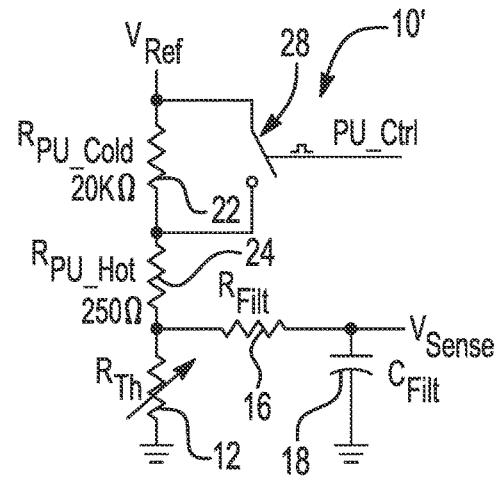
FIG. 2 is a circuit diagram depicting another implementation of a temperature monitoring circuit, the circuit being suitable for measuring temperatures over a broad range of temperatures by providing the ability to switch between two known pull-up (linearization) resistances.

Another implementation of a temperature monitoring circuit 10' is shown in FIG. 2. The temperature monitoring circuit 10' includes a thermistor 12, a noise filter resistor 16, a noise filter capacitor 18, a switch 28, a cold pull-up resistor 22 intended to linearize the circuit at cold temperatures, a hot pull-up resistor 24 intended to linearize the circuit at hot temperatures. The switch 28 can selectively direct electrical current through (or divert electrical current around) the cold pull-up resistor 22 and can be implemented as a MOSFET that is electrically connected to a microcontroller via its gate; this allows the software of control system 26 to control the state of the switch 28 (MOSFET). In this implementation, the cold pull-up resistor 22 can have a resistance value of 20,000Ω (20250Ω actually, since it's in series with the hot pull-up resistor 24) when the MOSFET is off (switch 28 open) and the hot pull-up resistor 24 can have a resistance value of 250Ω when the MOSFET is on (switch 28 closed). However, it should be understood that these values can be different depending on the implementation (thermistor characteristics, desired temperature ranges, etc.). The circuit 10' can control the switch 28 to close when a sensed temperature rises above 75° C. and remain closed until the sensed temperature falls below 65° C. Using different values for switching from mode to mode is called hysteresis and is intended to prevent "dithering" or "hunting" in the circuit's behavior. Obviously other switching control temperature thresholds can be used depending on the implementation (selected linearization resistances, desired temperature ranges, etc.) A control system 26 (shown in FIG. 4) can couple with the temperature monitoring circuits 10, 10' and include a microcontroller, such as an electronic control unit (ECU), that senses the voltage at a node, controls the switch, and executes the methods disclosed herein. The control system 26 can carry out or otherwise implement the control model described below. The microcontroller can be any type of device capable of processing electronic instructions including microprocessors, microcontrollers, host processors, controllers, vehicle communication processors, and application specific integrated circuits (ASICs). It can be a dedicated processor used only to carry out the described methods or can be shared with other computer systems. The microcontroller executes various types of digitally-stored instructions, such as software or firmware programs stored in memory. However, it should be appreciated that other implementations are possible in which at least some of these elements could be implemented together on a printed circuit board.

Figure 3:
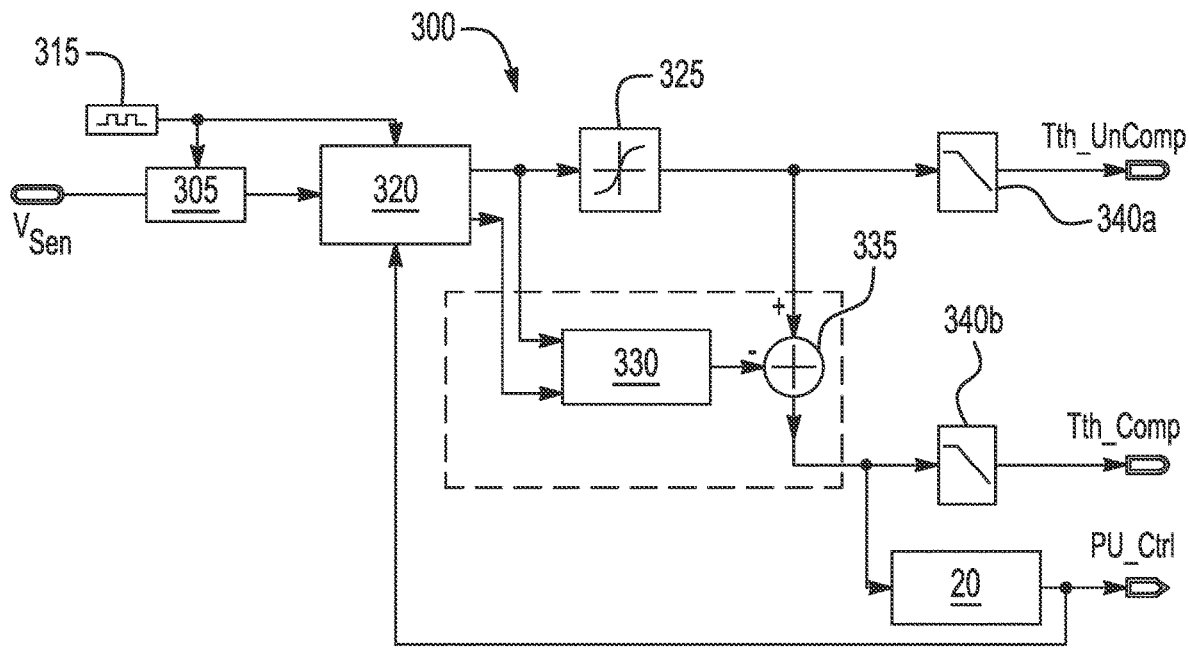
FIG. 3 is a block diagram depicting an implementation of control model capable of carrying out a method of determining an amount of thermistor self-heating and producing a compensated temperature indication.

A control model capable of carrying out a method of determining an amount of thermistor self-heating, compensating the reported thermistor temperature, and being implemented on a microprocessor is shown in FIG. 3. The control system 26 can implement the model to determine thermistor temperature ($T_{th}$) and an amount of electrical power dissipated by the thermistor ($P_D$). This can be determined based on the known supply voltage ($V_{REF}$), the known pull-up resistance ($R_{PU}$), and a thermistor resistance that can be determined based on a value output by an analog-to-digital converter (ADC that receives a voltage level sensed ($V_{SEN}$) at the temperature monitoring circuit. Thermal rise ($T_{rise}$), due to thermistor self-heating, can be determined based on power dissipated ($P_D$) and a heat dissipation constant (HDC). A more accurate or true sensed temperature can be determined by subtracting thermal rise from the sensed temperature ($T_{th} - T_{rise} = T_{true}$).

The control model can receive $V_{SEN}$ at an input pin at block 305. An ADC can process $V_{SEN}$ at block 305. A pulse generator at block 315 can direct the frequency of sensing. In one embodiment, the pulse generator can initiate a determination once every 50 milliseconds (ms). In some implementations that include the cold pull-up resistor 22 and the hot pull-up resistor 24, the model can determine whether the switch 28 is active or "on" thereby directing the flow of current through only the hot pull-up resistor or if the switch is not active or "off" resulting in current flow through both the cold pull-up resistor and the hot pull-up resistor. The switch 28 can include an input (control) signal that indicates the desired state of the switch (on or off) thereby controlling whether the current is flowing through both the cold pull-up resistor and the hot pull-up resistor or just the hot pull-up resistor. This control signal is determined by logic block 20 of FIG. 3 based on the compensated temperature indication and the hysteretic switching thresholds of the system. At block 320, the thermistor resistance ($R_{TH}$) can be determined. In one example, $R_{TH}$ can be determined by multiplying the resistance value of the pull-up resistor or resistors by a numerical output of the ADC and dividing that by the numerical output of the ADC subtracted from the number of possible values. In one example, the number of possible values can be 4096 if the output from the ADC is 12 bits, but this can change depending on the implementation. $R_{TH}$ can be used to determine thermistor temperature $T_{th}$. The microprocessor can access a look up table at block 325 to determine a thermistor temperature value associated with the determined thermistor resistance and that value can be output as the determined thermistor temperature $T_{th}$.

The determined thermistor resistance $R_{TH}$, the level of voltage supplied to the thermistor, and the pull-up resistor values can be used at block 330 to determine the power dissipated $P_D$ by the thermistor. The microprocessor can divide the level of voltage by $(R_{PU}+R_{TH})^2$ times $R_{TH}$. Using $P_D$, the microprocessor can determine the thermal rise (self-heating) $T_{rise}$ by multiplying the power dissipated by the heat dissipation constant (HDC). $T_{rise}$ can then be provided to a summation block 335 where it is subtracted from the determined thermistor temperature $T_{th}$ to yield a compensated thermistor temperature value $T_{true}$. In these implementations, $T_{rise}$ can be lag filtered to approximate a thermal time constant ($\tau$) of the thermistor. It is also possible to filter $T_{true}$ to filter (reduce) calculation noise at blocks 340a and 340b.

Figure 4:
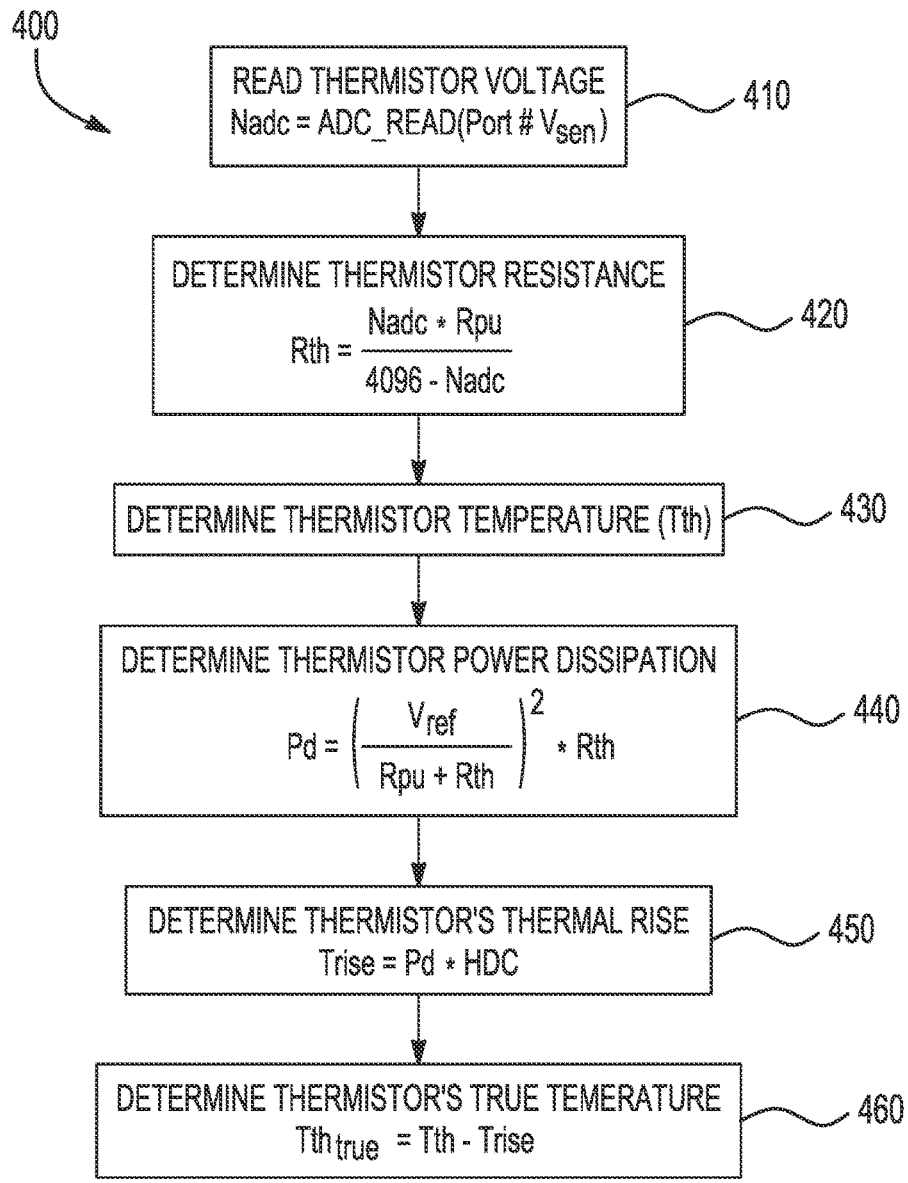
FIG. 4 is a flow chart depicting an implementation of a method of compensating for self-heating effects of a thermistor.

Turning to FIG. 4, an implementation of a method 400 of compensating for self-heating effects of a thermistor is shown. The method 400 begins at step 410 by reading the thermistor voltage. Next, at step 420, a thermistor resistance can be determined. At step 430, a thermistor temperature can be determined. The thermistor temperature can be determined in a number of ways. For example, the thermistor temperature can be determined by accessing a lookup table that links known values of thermistor resistance to corresponding values of thermistor temperature. In another example, the thermistor temperature can be determined by using a polynomial curve-fitting method. At step 440, a thermistor power dissipation value can be determined and, at step 450, using the power dissipation determined during step 440 and the HDC, we can determine the thermal rise of the thermistor. At step 460, we can determine the true temperature of the thermistor by subtracting the thermal rise of the thermistor from the determined thermistor temperature. The method 400 then returns to step 410 and repeats at some predetermined rate.

Figure 5:
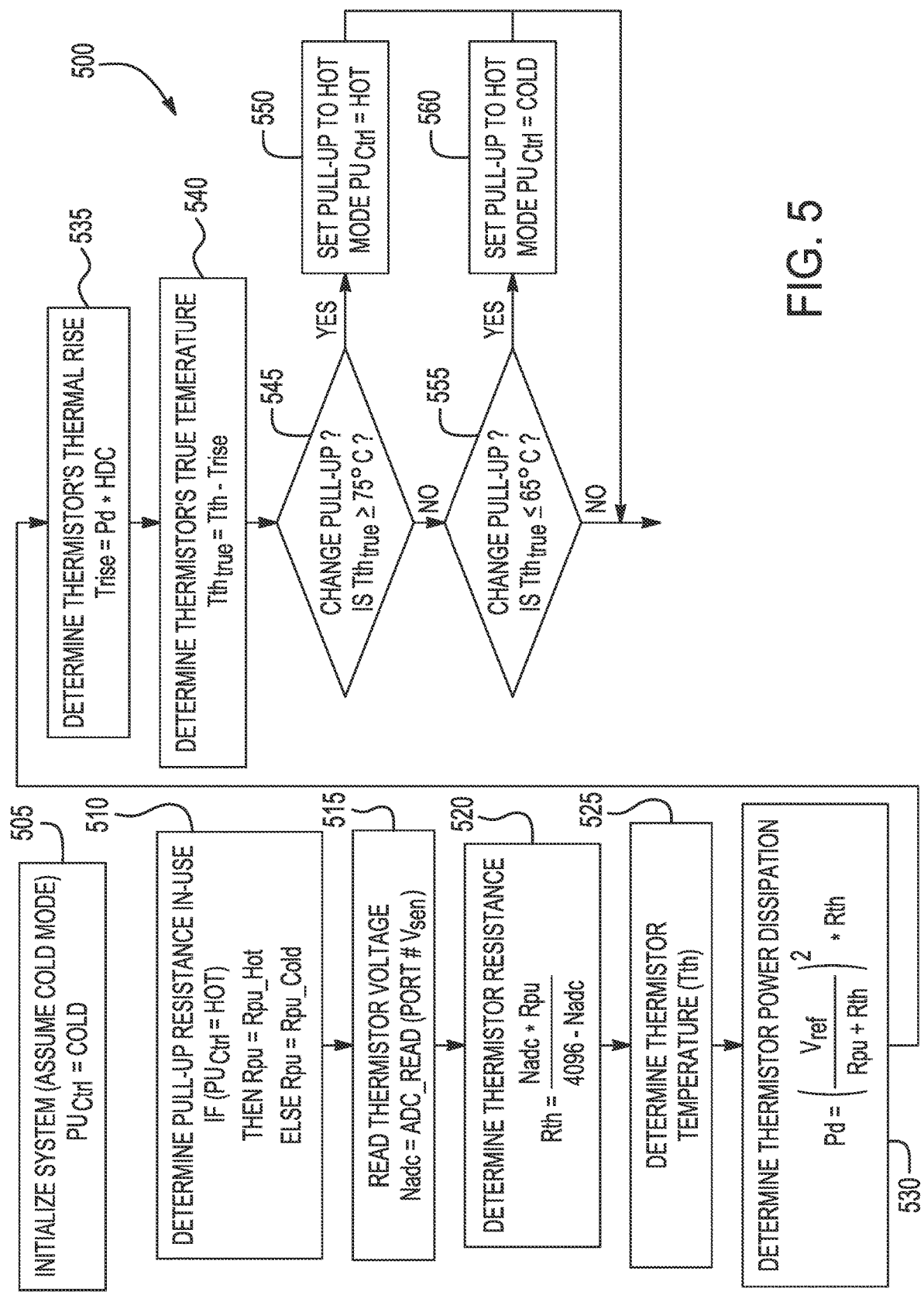
FIG. 5 is a flow chart depicting another implementation of a method of compensating for self-heating effects of a thermistor.

FIG. 5 depicts another implementation of a method 500 of compensating for self-heating effects of a thermistor. The method 500 begins at step 505 by establishing or assuming that the control system 26 has initialized its process execution by assuming the switch 28 is open and is in a cold mode. The method 500 proceeds to step 510 and determines whether the switch 28 is closed. If the switch 28 is open, the system 26 determines that a cold mode exists; otherwise, a hot mode exists. Based on which mode is presently active, the appropriate value for the pull-up linearization resistance is selected; this selected pull-up value will be used later in step 520. At step 515, a thermistor voltage can be determined. At step 520, a thermistor resistance can be determined. And at step 525 a thermistor temperature can be determined. The method 500 proceeds to step 530 and a power dissipation value can be determined. At step 535, the thermal rise of the thermistor can be determined and at step 540 the true temperature of the thermistor can be determined. The method 500 proceeds to step 545 during which the control system 26 can compare the true temperature of the thermistor with a high threshold. In this implementation, the high threshold can be 75° C. If the control system 26 determines that the true temperature of the thermistor is greater than the high threshold, then the method 500 proceeds to step 550; the system 26 can close the switch 28 and determine a hot mode exists wherein a low (small) linearization resistance is presented to the thermistor. Otherwise, the method 500 proceeds to step 555 during which the control system 26 can compare the true temperature of the thermistor with a low threshold. In this implementation, the low threshold can be 65° C. If the control system 26 determines that the true temperature of the thermistor is less than the low threshold, then the method 500 proceeds to step 560; the system 26 can open the switch 28 and determine a cold mode exists wherein a high (large) linearization resistance is presented to the thermistor. The method 500 then returns to step 510 and repeats at some predetermined rate.

Figure 6:
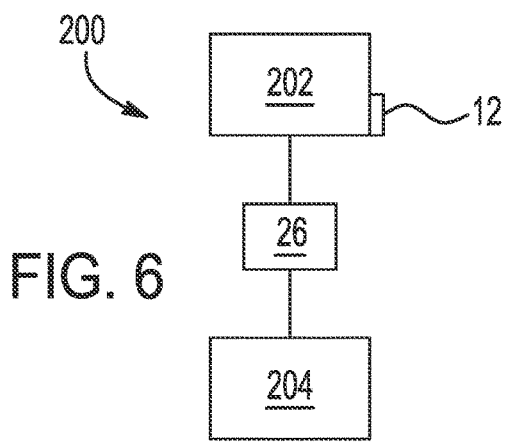
FIG. 6 is a block diagram depicting an implementation of a battery electric vehicle including a temperature monitoring circuit.

The control model, methods, and thermistor described above can be used in any one of a number of different applications. One application is a rotary electric machine used to propel a battery electric vehicle (BEV) 200. Turning to FIG. 6, an implementation of BEV 200 is shown. The BEV 200 includes one or more rotary electric machines 202 (also referred to as electric motors, generators, or motor/generator units) having a stator and a rotor that can be angularly displaced relative to the stator (not shown). One or more thermistors 12 can be coupled to the rotary electric machine 202 to monitor its temperature, or more specifically, the temperature of a component within the machine, such as the stator windings (not shown). It is common practice to monitor the temperature of the stator windings in order to protect them from overheating, and for purposes of redundancy it is common to utilize two such thermistors at different locations within the stator windings. In one implementation, the rotary electric machine 202 is a permanent magnet synchronous electrical machine, which includes a rotor having a plurality of angularly-spaced permanent magnets. The permanent magnets can be made from any one of a number of different materials, one example of which is a neodymium alloy or other rare earth element. The stator can receive electrical current the supply of which can be controlled by the control system 26 that induces the angular displacement of the rotor relative to the stator. The control system 26 can also implement the control model and method steps discussed above. The control system 26 can include an array of microprocessors and power control electronics that facilitate the operation of the electrical machine(s) 202. These electronics can include an inverter implemented using a plurality of MOSFETs that switch on and off according to a choreographed order and timing at the direction of a motor controller to induce rotor angular movement. In addition to the inverter, the control system 26 can include a DC-DC converter (not shown) to regulate voltage levels of electrical power supplied to the electrical machine 202.

The term "battery electric vehicle" or "BEV" can refer to vehicles that are propelled, either wholly or partially, by rotary electric machines. BEV can refer to electric vehicles, plug-in electric vehicles, hybrid-electric vehicles, and battery-powered vehicles. A vehicle battery 204 can supply DC electrical power, that has been converted from AC electrical power, to the electrical machine(s) 202 that propel the EV. As noted above, the control system 26 can convert the DC electrical power into AC electrical power to induce angular movement of the rotor relative to the stator. The vehicle battery 204 or batteries are rechargeable and can include lead-acid batteries, nickel cadmium (NiCd), nickel metal hydride, lithium-ion, and lithium polymer batteries, to name a few. A typical range of vehicle battery voltages can range from 200 to 800V of DC electrical power (VDC). Where rotary electric machines are used for supplemental drivetrain power 48V is often used.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of compensating for self-heating effects of a thermistor used for measuring a temperature within a system comprising:
    (a) measuring a voltage across a thermistor;
    (b) determining a thermistor resistance based on a known supply voltage and a known biasing impedance supplying current to the thermistor;

(c) determining thermistor temperature based on the thermistor resistance and its known temperature dependency;
(d) determining a thermal rise value due to thermistor self-heating based on the known supply voltage, a known heat dissipation constant of the thermistor, and the determined thermistor resistance; and
(e) creating a compensated thermistor temperature value by subtracting the determined thermal rise value from the determined thermistor temperature.

2. The method of compensating for self-heating effects of a thermistor recited in claim 1, wherein step (a) further comprises producing a numerical value representing a fraction of the supply voltage using an analog-to-digital (ADC) converter.

3. The method of compensating for self-heating effects of a thermistor recited in claim 2, wherein step (b) further comprises multiplying the resistance value of a pull-up resistor or resistors by a numerical output of the ADC and dividing it by the numerical output of the ADC subtracted from a number of possible values.

4. The method of compensating for self-heating effects of a thermistor recited in claim 3, wherein the number of possible values equals 4096.

5. The method of compensating for self-heating effects of a thermistor recited in claim 1, wherein step (c) further comprises accessing a lookup table of corresponding resistance and temperature values.

6. The method of compensating for self-heating effects of a thermistor recited in claim 1, wherein step (d) comprises determining a power dissipated by the thermistor and multiplying it by a heat dissipation constant (HDC) to determine the thermal rise value.

7. The method of compensating for self-heating effects of a thermistor recited in claim 1, further comprising the step of controlling a switch to change a resistance value of a pull-up resistance based on temperature.

8. The method of compensating for self-heating effects of a thermistor recited in claim 1, further comprising the step of configuring the thermistor to be in thermal communication with a rotary electric machine or a component therein.

9. A temperature monitoring circuit and control system for compensating for self-heating effects of a thermistor used for measuring a temperature within a system, comprising: a thermistor, a pull-up resistor, a node configured to receive a reference voltage, and a node configured to supply a sensed voltage, wherein the control system measures a voltage across the thermistor; determines a thermistor resistance based on a known supply voltage and a known biasing impedance supplying current to the thermistor; determines thermistor temperature based on the thermistor resistance and its known temperature dependency; determines a thermal rise value due to thermistor self-heating based on the known supply voltage, a known heat dissipation constant of the thermistor, and the determined thermistor resistance; and creates a compensated thermistor temperature value by subtracting the determined thermal rise value from the determined thermistor temperature.

10. The temperature monitoring circuit and control system recited in claim 9, wherein the control system produces a numerical value representing a fraction of the supply voltage using an analog-to-digital (ADC) converter.

11. The temperature monitoring circuit and control system recited in claim 10, wherein the control system multiplies the resistance value of a pull-up resistor or resistors by a numerical output of the ADC and divides it by the numerical output of the ADC subtracted from a number of possible values.

12. The temperature monitoring circuit and control system recited in claim 11, wherein the number of possible values equals 4096.

13. The temperature monitoring circuit and control system recited in claim 9, wherein the control system accesses a lookup table of corresponding resistance and temperature values.

14. The temperature monitoring circuit and control system recited in claim 9, wherein the control system determines a power dissipated by the thermistor along with a heat dissipation constant (HDC) to determine the thermal rise value.

15. The temperature monitoring circuit and control system recited in claim 10, wherein the control system controls a switch to change a resistance value of a pull-up resistance based on temperature.

16. The temperature monitoring circuit and control system recited in claim 10, wherein the thermistor is configured to be in thermal communication with a rotary electric machine or a component therein.

17. The method of compensating for self-heating effects of a thermistor recited in claim 1, wherein step (c) further comprises calculating the thermistor's temperature using a polynomial curve-fit based on its resistance.

18. The temperature monitoring circuit and control system recited in claim 9, wherein the control system calculates the thermistor's temperature using a polynomial curve-fit based on its resistance.

* * * * *